C. H. NORWOOD.
SYSTEM OF ELECTRIC MOTOR CONTROL.
APPLICATION FILED JAN. 4, 1913.
1,063,377.
Patented June 3, 1913.
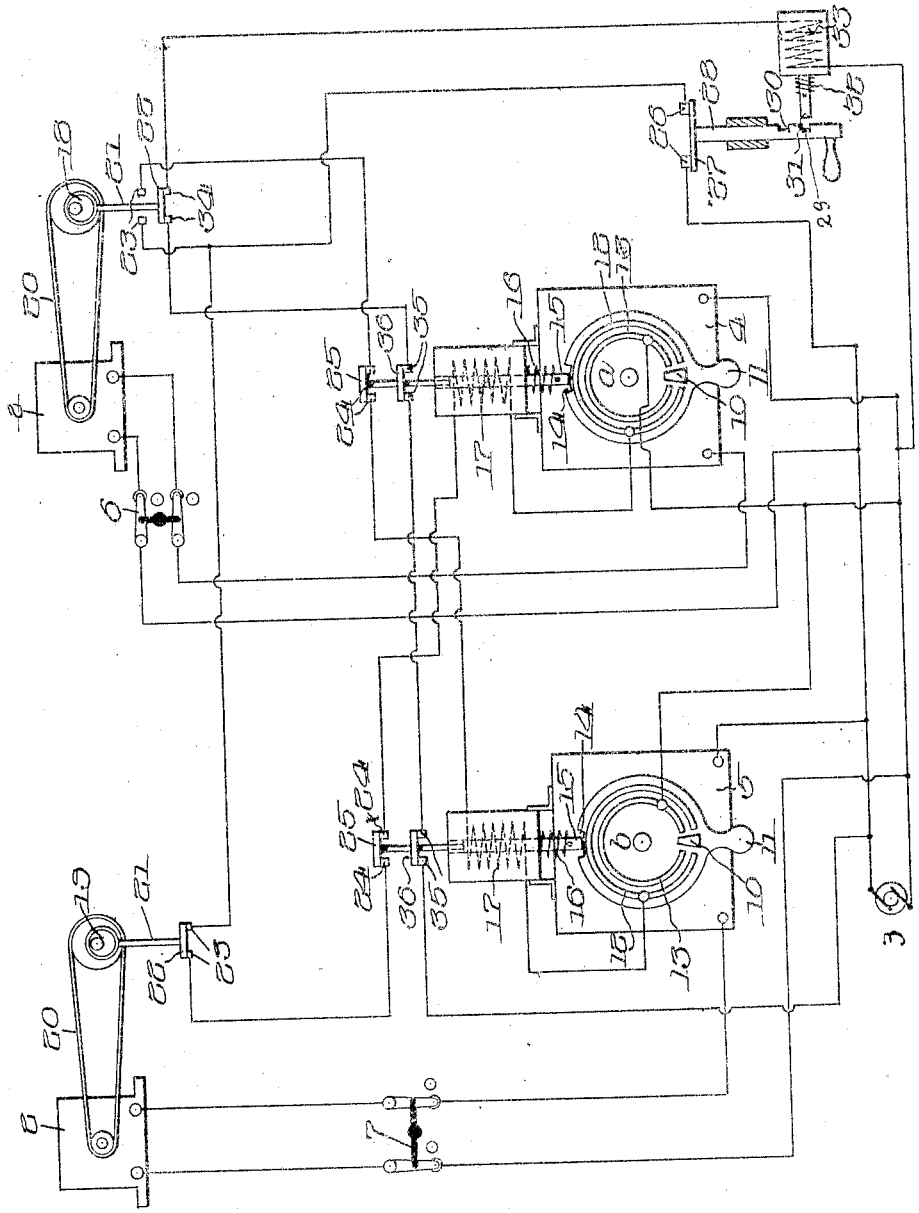
Witnesses:
Jno. H. Nelson Jr.
Etta L. White
Inventor
Clarence H. Norwood.
By G. L. Grogg
Atty.

UNITED STATES PATENT OFFICE.

CLARENCE H. NORWOOD, OF CHICAGO, ILLINOIS.

SYSTEM OF ELECTRIC-MOTOR CONTROL.

1,063,377.  Specification of Letters Patent.  Patented June 3, 1913.

Application filed January 4, 1913. Serial No. 740,158.

*To all whom it may concern:*

Be it known that I, CLARENCE H. NORWOOD, citizen of the United States, residing at Chicago, in the county of Cook and State of Illinois, have invented a certain new and useful Improvement in Systems of Electric-Motor Control, of which the following is a full, clear, concise, and exact description, reference being had to the accompanying drawings, forming a part of this specification.

My invention relates to power transmission mechanism including motors and means whereby one motor may mechanically prevent the operation of the controller for another motor during the operation of the first motor to prevent the second motor from operating until the first motor has operated.

My invention finds a useful embodiment in those power transmission systems including electric motors which are associated with apparatus and circuits therefor whereby one electric motor is prevented from operation until another electric motor has gone through a given cycle of operations whereupon the first mentioned motor is permitted to operate. In one embodiment of my invention, when the first mentioned motor is working through a given cycle of operations the second mentioned motor is prevented from operating, this second mentioned motor being permitted to operate when the first mentioned motor has completed its cycle.

In the simplified form of the invention I provide electro-magnetic mechanism for locking the circuit opening and closing switch or circuit controller belonging to the motor whose operation is to be delayed until another motor has worked through a cycle. Where each of two motors is to have its operation deferred until the other has worked through its cycle the switches or controllers of both motors are provided with the locking means.

Another feature of my invention includes a master switch in the main circuit and an electro-magnetic device so coöperatively related with the master switch as to prevent the operation thereof to close the main circuit until all the apparatus is in normal or idle condition, this electro-magnetic device including an element which prevents the opening of the master switch while the apparatus is in operation.

I will explain my invention more fully by reference to the accompanying drawing showing the preferred embodiment thereof when two motors are employed each of which is to operate successively to the other, the drawing diagrammatically illustrating the motors and the associate circuit controllers and electro-magnetic devices for realizing the objects of the invention.

I have diagrammatically shown two electric motors 1 and 2 which are, in the embodiment here shown, alternately supplied with current from a generator 3 (a direct current generator being shown though the invention is not to be limited to the use of direct current) through the intermediation of controlling devices 4 and 5, individual respectively to the motors 1 and 2 and which are mechanically limited to successive operation. It is to be understood however that I do not limit myself to the employment of means for mechanically locking both controllers since the invention is realized in the employment of but one mechanically locked controller for preventing its associate motor from operating until the other motor has operated. It is also obvious that the number of motors may be increased and that a variety of controllers or motor circuit opening and closing switches may be employed in place of the type of controllers diagrammatically illustrated at 4 and 5. The type of controller shown at 4 and 5 is such that the motors may be gradually brought to speed and may be gradually brought to rest though I do not limit myself to the graded control of the motor circuits since switches may be employed in place of the controllers illustrated that merely open and merely close the motor circuits.

The circuit of the motor 1 includes a motor circuit opening and closing switch 6, diagrammatically shown as a hand operated switch but which, by well known mechanism, may be operated when the motor has worked through its cycle. The circuit of the motor 2 is provided with a similar switch 7. The portion of the motor circuit that includes the switch 6 terminates at a controller 4 and the portion of the motor circuit that includes the switch 7 terminates at a controller 5. These controllers may, as stated, be provided with the usual multiplicity of contacts for grading the speeds of the motors, and as these contacts form no essential part of my present invention I will not illustrate or describe the same. Each controller has added thereto a contact 10 that moves with the controller handle 11. Each controller is also provided with stationary segmental contacts 12 and 13 that are out of engagement with the contacts 10 when the controllers are idle, that is when the controller handles 11 are in central or normally idle positions, in which positions no current is delivered to the motors. The handles 11 are associated with locking devices, to be described, which normally serve to prevent such operation of the handles as would permit closure of the motor circuits, but which locking devices permit sufficient operation of the handles to enable the contacts 10 to be brought into engagement with the contacts 12 and 13 for the purpose of closing circuits through magnets to release the locking devices from the handles.

As illustrated, each handle 11 is provided with a disk continuation in which there is formed a locking notch 14 having sufficient peripheral length at all times to permit the associate contact 10 to be moved into engagement with the accompanying contacts 12 and 13 for the purpose which has been stated. Each locking notch 14 receives an end of a solenoid core 15 when the associate handle is centrally placed and the coil of the solenoid is deënergized, the solenoid core constituting means for mechanically limiting the operation of the controller handle to prevent the associate motor from being included in circuit when such core engages the notch 14. A spring 16 is shown in association with each core 15 for engaging such core with the associate notch 14. The solenoid coil 17 is wound and so positioned as to attract the solenoid core away from the notch 14 in opposition to the force of the spring 16 when the solenoid coil is energized. The circuit for each solenoid coil 17 may be traced from the lower terminal of the generator 3 to the contact 13, the contact 10, the contact 12, the solenoid coil, thence by connections hereinafter to be described and which are plainly illustrated, to the upper terminal of the generator 3.

The motor 1 operates an eccentric 18 and the motor 2 operates an eccentric 19, belts 20 being illustrated as the driving connections between the motors and said eccentrics, though it is to be understood that the motors operate at very high speeds as compared with the eccentrics, to which end any suitable power transmission mechanism may be employed. The eccentrics 18 and 19 are provided with eccentric rods 21 that carry contact bars 22. The contact bars 22 serve to connect contacts 23, the contacts 23 of the motor 1 which is assumed to be the first to operate being normally separated from the associate contact bar 22, while the contacts 23 of the motor 2 are normally connected by the associate contact bar 22. It is assumed that the motor 1 will have performed its cycle of operations when the eccentric 18 has operated through half of its cycle at which time the switch 6 is suitably opened and whereupon the contacts 23 of the motor 1 are closed by the associate contact bar 22. Assuming that the handle 11 of the controller pertaining to motor 1 has been restored to central position, after this motor has worked through its cycle, a circuit is established through the solenoid coil 17 pertaining to motor 2 to permit the controller pertaining to this motor to be operated to enable such motor to perform its work and which circuit may be traced from the lower terminal of the generator 3 through the contact 13, the actuated contact 10, the contact 12, the solenoid coil 17 pertaining to motor 2, the contacts 24 pertaining to the controller of motor 1 that are closed by the contact bar 25 (carried by an extension of the solenoid core and brought into engagement with the contacts 24 by the associate spring 16 when the associate solenoid coil 17 is included in open circuit upon the restoration of the controller handle 11 to central position) the contacts 23, the contacts 26 of the master switch that are then engaged by master switch contact bar 27, thence to the upper terminal of the generator 3. The controller belonging to motor 2 may then be operated to permit said motor to work through its cycle, the switch 7 being suitably opened when the motor 2 has worked through its cycle. As soon as the motor 2 has begun to operate, the contacts 22 and 23 associated therewith are separated so as to establish a gap in the circuit of the solenoid coil 17 belonging to the controller of motor 1 so that this solenoid coil cannot be energized until the motor 2 has worked through its cycle, which is when its eccentric 19 has worked through its cycle whereupon the contact bar 22 is again in connection with the contacts 23. Thus after the motor 2 has worked through its cycle the motor 1 may again be permitted to work through its cycle in the manner which has been described. The solenoid coil 17 individual to motor 2 is serially related to the contacts 24 and 25 so that this solenoid coil cannot be energized until the controller handle individual to motor 1 is in central position. The solenoid coil individual to motor 1 is similarly serially related with contact elements 24 and 25 individual to motor 2 and the control of whose relationship is similar to that of contacts 24 and 25 individual to motor 1, whereby the controller individual to motor 1 cannot be operated until the handle of the controller individual to motor 2 has been restored to central position. I do not limit myself however to the employment of the contacts 24 and 25 in their association with the controllers, nor as has been stated, do I limit myself to the equipment whereby the motor 2, second to operate, prevents motor 1 from again operating until the motor 2 has worked through its cycle. The eccentrics 19 are shown as one type of mechanism that may be employed for positioning the contact bars 22, but the invention is not to be limited thereto.

I will now describe that feature of my invention which is shown in association with the novel features which have been specifically described in connection with the drawing but which is not to be limited in its use to such association. This feature of the invention includes a master switch having the contacts 26 and 27, the contact 27 being carried upon a longitudinally movable arm 28 that is provided with two notches 29, 30. These notches are capable of receiving the projecting ends of a solenoid core 31 when pressed outwardly by a spring 32 when the solenoid coil 33 pertaining to the core 31 is deënergized. The coil 33 is energized when the apparatus is idle and the controller handles are in central position, the circuit then established for this solenoid coil being traceable from the lower terminal of the generator 3 through the contacts 34 (that are joined by the contact bar 22 pertaining to motor 1 when this motor is idle), the contacts 35 pertaining to the controller individual to motor 1 that are connected by the contact bar 36 carried by the core of such controller, such engagement being effected when the controller handle is centraled, the contacts 35 and 36 pertaining to the controller individual to motor 2 and similar in disposition and circuit arrangement to the correspondingly numbered contacts of the controller individual to motor 1, thence to the upper terminal of the generator 3.

The embodiment of the invention illustrated is of service in connection with the operation of bridges in which the motor 1 serves to unlatch the normally latched bridge, the motor 2 then operating to open the bridge and after the bridge has been opened sufficiently long to close the bridge whereafter the motor 1 operates again to latch the bridge. Under these circumstances the motor 2 is not equipped with contacts 34. When the motors have performed their work and the controller handles are in central positions, the solenoid coil 33 is energized so that the core 31 is withdrawn from engagement with the arm 28, this being the normal relative relation of said core and arm when the apparatus is normal so that the master switch may be closed when it is desired again to start the motors into operation. When the apparatus is idle the master switch is open and cannot be closed if for any reason the circuit of the solenoid coil 33 is open, as for example, when the controller handles are not centrally positioned, the solenoid core then engaging the upper notch 29. If the master switch has been closed it is maintained closed until the motors have completed their work by the engagement of the core 31 with the notch 30, the core being released owing to the deënergization of the coil 33 occurring as a consequence of the disconnection of the contacts 35 of the controller individual to motor 1.

While I have herein shown and particularly described the preferred embodiment of my invention it is obvious that changes may readily be made without departing from the spirit of the invention and I do not therefore wish to be limited to precise details of construction and circuit arrangement specifically set forth, but

Having thus described my invention I claim as new and desire to secure by Letters Patent as follows:—

1. A power transmission system including two electric motors whose order of operation is to be controlled; circuits for said motors; a switch for controlling the circuit of the motor that is to be the second to operate; and mechanism governed by the first motor to operate for holding the switch while the first motor is operating then to prevent the second motor from operating, such mechanism being released when the first motor has operated then to permit the second motor to operate.

2. A power transmission system including two electric motors whose order of operation is to be controlled; circuits for said motors; a switch for controlling the circuit of the motor that is to be the second to operate; an electro-magnetic device for locking said switch to prevent the motor to which it is individual from being operated; a circuit for said electro-magnetic device; and switching mechanism for governing the circuit of said electro-magnetic device and governed by the motor first to be operated, this switching mechanism serving to control the circuit of the electro-magnetic device to maintain said switch locked when the motor first to be operated is operating and operating to alter such circuit when the motor first to be operated has operated to release the switch thereafter to permit the operation of the motor second to be operated.

3. A power transmission system including two motors whose order of operation is to be controlled; circuits for said motors; a controller for the motor that is to be the second to operate; and mechanism governed by the first motor to operate for holding the controller while the first motor is operating then to prevent the second motor from operating, such mechanism being released when the first motor has operated.

4. A power transmission system including two electric motors whose order of operation is to be controlled; circuits for said motors; a switch individual to each motor for controlling its operation; an electro-magnetic device for locking the switch individual to one motor; a circuit for said electro-magnetic device; and switching mechanism governed by the switch individual to the other motor and taking part in the control of the circuit of said electro-magnetic device.

5. A power transmission system including two electric motors whose order of operation is to be controlled; circuits for said motors; a switch individual to each motor for controlling its operation; an electro-magnetic device for locking the switch individual to one motor; a circuit for said electro-magnetic device; and switching mechanism governed by the switch individual to the other motor and taking part in the control of the circuit of said electro-magnetic device, said switching mechanism being so interrelated with the motor controlling switch that operates it as to maintain the other motor controlling switch in idle position when the motor which is individual to the switch that operates said switching mechanism is operating.

6. A power transmission system including an electric motor having a controlling circuit; a switch for governing its operation; a master switch taking part in associating the motor with a source of operating current; electro-magnetic means for preventing and permitting the operation of said master switch; a circuit for said electro-magnetic means and switching mechanism jointly controlled by the motor and its controlling switch for governing the circuit of said electro-magnetic means and operating to prevent the closure of the master switch when the motor and its controlling switch are not in normal idle condition.

7. A power transmission system including an electric motor having a controlling circuit; a switch for governing its operation; a master switch taking part in associating the motor with a source of operating current; electro-magnetic means for preventing and permitting the operation of said master switch; a circuit for said electro-magnetic means and switching mechanism jointly controlled by the motor and its controlling switch for governing the circuit of said electro-magnetic means and operating to maintain the master switch closed when the motor is in operation.

In witness whereof, I hereunto subscribe my name this 26th day of June A. D., 1912.

CLARENCE H. NORWOOD.

Witnesses:
LILLIAN M. HERWIG,
J. E. NOONAN.